March 6, 1951     G. E. LINNERT     2,544,335
WELDING METHOD AND PRODUCT
Filed Feb. 25, 1948
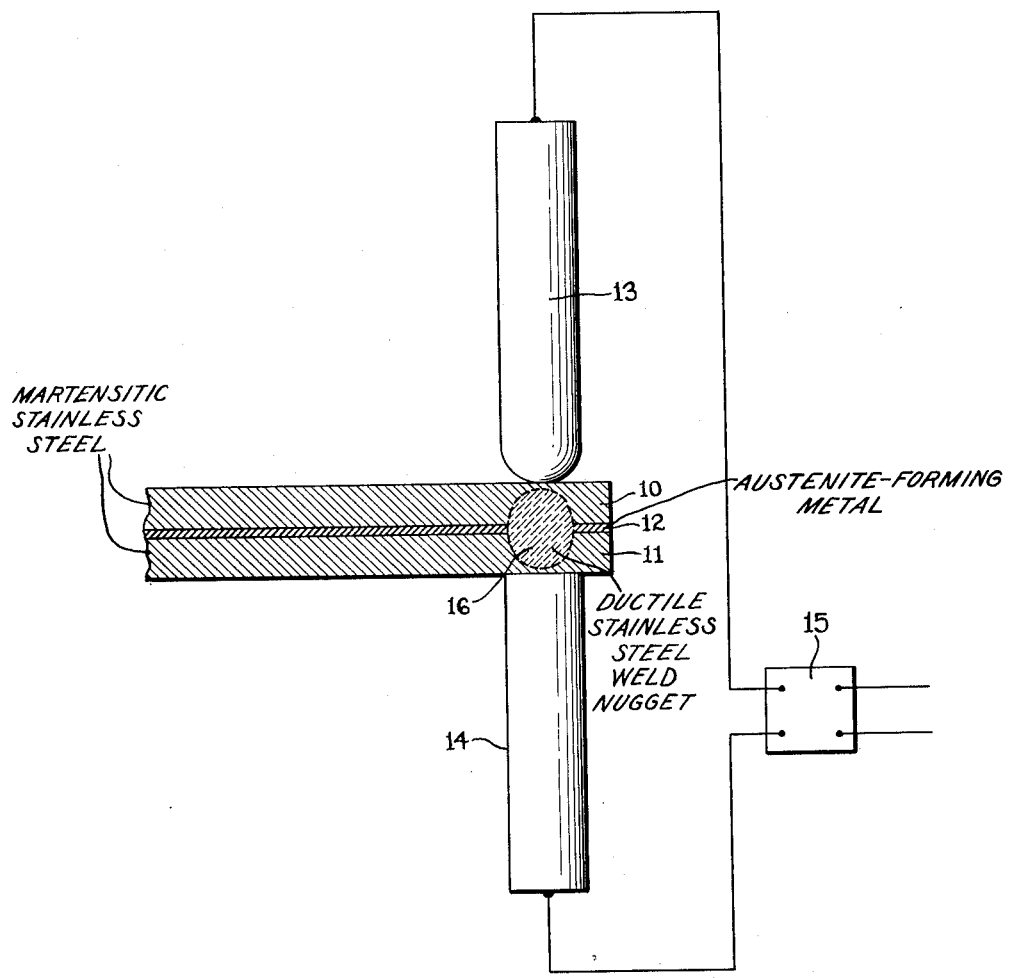
INVENTOR.
GEORGE EDWIN LINNERT
BY
HIS ATTORNEY Patented Mar. 6, 1951

2,544,335

UNITED STATES PATENT OFFICE 2,544,335

WELDING METHOD AND PRODUCT

George Edwin Linnert, Baltimore, Md., assignor to Armco Steel Corporation, a corporation of Ohio Application February 25, 1948, Serial No. 10,637

5 Claims. (Cl. 219—10)

This invention relates to the welding of metal and in particular it has to do with electrical resistance welding of stainless steel.

An object of my invention is the provision of a simple, reliable and thoroughly practical method for electrical resistance spot, seam or butt welding two or more martensitic, or partially martensitic, stainless steel components whether for example these be the ends of a single steel piece or separate elements of like or different alloy composition.

Another object of this invention is the provision of a rapid, efficient and highly satisfactory method for achieving durable, substantially ductile welds in quench-hardened martensitic stainless steel.

A further object of the present invention is that of providing strong, ductile and reliable electrical resistance spot or seam welded joints in hardenable stainless steel.

Other objects of my invention in part will be obvious and in part pointed out hereinafter.

The invention accordingly consists in the combination of elements, composition of materials and features of products, and in the several steps and the relation of each of the same to one or more of the others as described herein, the scope of the application of which is indicated in the following claims.

In the accompanying drawing the single figure illustrates certain features of my invention as more particularly referred to hereinafter.

As conducive to a clearer understanding of certain features of my invention, it may be noted at this point that stainless steel usually is recognized as containing approximately 10% to 35% chromium, with or without supplemental additions of one or more such elements as manganese, silicon, cobalt, copper, molybdenum, tungsten, vanadium, columbium, titanium, selenium and sulphur, for special purposes, and the remainder substantially all iron. A great number of the stainless steels are hardenable by heat treatment, among these being martensitic steels containing about 0.08% to 1.10% carbon, 11% to 18% chromium, with or without nickel, this in small amounts up to say 2.5%, sometimes an element or elements for serving special purposes, and the remainder substantially all iron.

The stainless steels which acquire hardness by heat treatment have many uses often varying with the included chromium and carbon contents. In certain instances, the steels are made into such products as blades and buckets for turbines, valves, valve seats, valve stems, and other parts subject to high and low pressure gas or steam conditions. Such articles as cutting, dental and surgical instruments, golf clubs, rifle barrels, and interior ornamental hardware are other examples. While many of the steels do not have the corrosion resistance of comparatively high-alloy, non-hardenable stainless steels, they often give more satisfactory service for a particular use, from the standpoint of hardness, elastic properties and strength.

There are occasions where the martensitic stainless steels are fabricated from wire or the like into grilles, screens or gratings such as for exposure to outdoor air or mine water. On other occasions, sheet or strip of the steel is made into such products as high grade architectural and mechanical trim, bank vault trimmings or safety deposit boxes for withstanding the corrosive effects of moisture and handling. Still other and further examples of products of the hardened steels are milk bottling machine parts, parts for spray machines or oil pumps, laundry machinery, chemical equipment, or the like. Many of these and numerous other products of the steels render it desirable to fabricate the metal by steps including one or more welding operations.

The successful welding of hardened or hardenable stainless steel, however, has long been a problem because of such reasons as the tendency of cracks to form in the welding heat-affected zone of the base metal. In spot or seam welding the steels in accordance with heretofore known electrical resistance methods, the welding heat-affected area often air hardens to become extremely brittle and unreliable. In being brittle and greatly lacking in ductility, the welds have poor resistance to shock or impact, are unable to endure much bending, shear or other stress. These faults and susceptibilities to failure have had an appreciable limiting affect upon successful use of the hardenable stainless steels and usually at best have called for structural changes to compensate for inherent weaknesses of the weld region.

In order to alleviate the difficulties from cracking and brittleness of the welded steels, the prior art calls for a carefully supervised control over the welding procedure, intended to assure proper post-heating or annealing. This extra procedure, however, is time consuming and often adds a cost figure which is prohibitive to production. Indeed, in certain types of fabricated articles and products post-heating or annealing is undesirable because of such factors as distortion beyond the weld zone induced by the extra heat and because of associated softening of the annealed metal. Sometimes too the avoidance of annealing becomes important to prevent any possible impairment of the metal hardness by the annealing heat and to maintain other properties consistent with the intended purpose or use of the previously hardened metal. Also there are occasions where general annealing or even localized annealing is not practicable, for example in certain instances where the weld is an integral part of a large structure.

An outstanding object of my invention accordingly is the provision of economical, sound, substantially crack-free electrical resistance welds in martensitic stainless steels, the welds being substantially non-brittle and ductile without annealing, and yet being reasonably hard.

Referring now more particularly to the practice of my invention, I provide welds, preferably electrical resistance welds, in stainless steel parent metal, as in fabricating sheet, strip, wire, rods and bars or like products of the steel, for example into aircraft components, trim, hardware and implements, or into any of a host of other products, illustratively casings, ducts, tubes, gratings and grilles. Among the martensitic stainless steels which I prefer to weld are those in the quench-hardened condition, containing about 0.08% to 1.20% carbon, 11% to 18% chromium, with or without nickel, the latter, when present, ranging up to 2.5% or often held to below 0.50%, and the remainder being substantially all iron, this sometimes with amounts of one or more supplemental elements of the steel as for special purposes.

In preparing the martensitic steel for the resistance welding operation, I introduce austenitic stainless steel, preferably one of the 18-8 chromium-nickel varieties, between the adjacent surfaces of the parent metal entering the intended zone of welding. Usually, the austenitic steel is a shim, as for example a strip, button, washer, wire, or rod, filling a gap between the parent metal. Thereafter, by electrical resistance welding operations, preferably by spot or seam welding, I fuse the austenitic stainless steel component, and the adjacent martensitic parent steel, thus providing a zone of molten metal in which the various constituents of the several steels intermingle to a substantial extent to form an alloy stainless steel welded joint or nugget containing substantially more austenite than the martensitic parent steel. A number of commercial martensitic stainless steels which are typical of the steels which I weld are noted by standard type number and composition in the following table.

vide enough austenite to ensure ductility. This thickness, or the quantity of austenitic steel desired for melting, of course depends somewhat upon that of the martensitic parent steel being welded, and also upon the particular alloy composition of the latter. Usually, as in the instance of employing an austenitic 18-8 chromium-nickel stainless steel shim, the thickness of this member ranges around one-twentieth of the combined thickness of the martensitic steel to be spot or seam welded, especially where the parent steel is in the form of superimposed or lapped sheet or strip. While this approximate ratio is preferred in certain instances, many other ratios also serve to give strong, ductile welds, and thus frequently are used.

The austenitic stainless steel shim or insert introduces high electrical resistance to the welding current at the point where fusion is important. Heat, therefore, is readily generated at the desired zone of welding. In view of the high electrical resistivity of the austenitic steel, the current introduced for melting the shim or insert and the immediately adjacent metal, is highly effective per unit of time. I find advantage in compressing the several steels at the desired point of welding; the austenitic steel being soft, readily gives good electrical contact tending to localize the zone of heating. The shim or insert fuses along with the parent steel, this producing a welded joint wherein the several steels are alloyed.

As illustrative of the practice of my invention, I provide, for spot welding, two pieces of Type 410 quench-hardened stainless steel sheet, respectively represented in the single figure of the drawing by the reference numerals 10 and 11. The two pieces each, for example, are 0.09 inch thick and contain about 0.10% carbon, 12.5% chromium, 0.50% manganese, 0.50% silicon, 0.03% sulphur and a like amount of phosphorus and the remainder substantially all iron. I superimpose these pieces to form a welded joint, at the same time employing an austenitic chromium-nickel stainless steel shim 12 as an intermediate member. This shim is say about 0.01 inch thick, and separates the two martensitic steel pieces by the amount of its thickness. In this instance, the shim illustratively analyzes about 0.11% carbon, 18.2% chromium, 8.3% nickel, 0.40% manganese, 0.50% silicon, very small amounts of sulphur and phosphorus, and the remainder substantially all iron.

I effect the spot welding operation, while positively holding the assembled pieces 10 and 11 in desired position with suitable clamping means.

*Weldable martensitic steels*

| Type No. | C | Cr | Ni | Mn | Si | S | P |
|---|---|---|---|---|---|---|---|
| 410 | 0.15 max | 11.50 to 13.50 | | 1.00 max | 1.00 max | 0.04 max | 0.04 max. |
| 414 | 0.15 max | 11.50 to 13.50 | 1.25 to 2.50 | 1.00 max | 1.00 max | 0.04 max | 0.04 max. |
| 416 | 0.15 max | 12.00 to 14.00 | | 1.00 max | 1.00 max | P or S or Se 0.07 min. Mo or Zr 0.60 max. | |
| 420 | 0.15 min | 12.00 to 14.00 | | 1.00 max | 1.00 max | 0.04 max | 0.04 max. |
| 431 | 0.20 max | 15.00 to 17.00 | 1.25 to 2.50 | 1.00 max | 1.00 max | 0.04 max | 0.04 max. |
| 440 A | 0.60 to 0.75 | 16.00 to 18.00 | | 1.00 max | 1.00 max | 0.04 max | 0.04 max. |
| 440 B | 0.75 to 0.95 | 16.00 to 18.00 | | 1.00 max | 1.00 max | 0.04 max | 0.04 max. |
| 440 C | 0.95 to 1.20 | 16.00 to 18.00 | | 1.00 max | 1.00 max | 0.04 max | 0.04 max. |

My invention is particularly useful for the resistance welding of sheet or strip by either spot or seam welding operations. However, it will of course be understood that it is applicable to other metal forms and a variety of special shapes. The austenitic stainless steel shim or the like employed for the weld preferably is sufficiently thick, to pro- In welding, I employ for example a Sciaky 60 kva. spot welding machine having opposed ⅝ inch electrodes 13 and 14, one with a flat tip and the other with a round tip, these on opposite sides of the work. The electrodes are forced, with say a pressure of 600 pounds against the sections to be welded. This pressure is not extremely critical, but serves such purposes as to improve the electrical contact between the several steel pieces and of the electrodes with the outermost of these sections. Meanwhile, I introduce an 18,000 ampere current to the electrodes and through the work from a suitable source of electrical supply 15. The current flows for a very brief interval and then is cut off. In this particular instance, the time of current flow is 10 cycles of 60-cycle current or 1/6 second. For heavier sections, a larger current dwell is usually best, while for lighter sections a shorter dwell, as for example 1/60 second or even less, often is advantageous. After the current dwell, my martensitic stainless steel pieces 10 and 11 are found to be integral with the austenitic steel piece 12, beneath the point where the welding machine electrodes were brought to bear. The weld is in the form of a spot or nugget 16 which is strong, ductile and substantially free of cracks and embrittlement. A weld so produced was subjected to a peel test, one end of the welded sections being gripped in a vise, and the component sheets being urged toward separation by driving a chisel between them. Before the weld spot 16 parted, the sheets were permanently distorted to form an included angel of approximately 30 degrees. A similar test made on two martensitic stainless steel sheets of the same composition and dimensions as before, but welded without a shim and otherwise the same conditions of welding, caused the weld nugget to snap in two before distortion of the sheets occurred.

While the duration of the passage of the current across the electrodes has been measured in the foregoing in terms of the number of cycles of 60-cycle welding current, it will be appreciated that 25-cycle, 15-cycle, direct current, or any other suitable welding current may be successfully employed in the practice of my invention. Further, it will be appreciated that I provide spot or seam welds between any of a number of martensitic stainless steel pieces, as for example from two up to four or more, using in addition enough austenitic stainless steel, such as an intermediate piece or pieces to achieve strength and ductility by alloying in the weld. In welding the section, the criterion is that the passage of a sufficiently high current, with sufficient pressure of the electrodes on the weld section, endures for a length of time sufficient to raise both the martensitic and austenitic components to the welding and alloying temperature and without overheating.

Thus according to my method of electric resistance welding, employing short dwell and high electrical currents, the various objects of my invention, together with many thoroughly practical advantages are obtained. Vastly increased and advantageous properties of strength, toughness and ductility are imparted to the weld. Moreover, it becomes possible to weld successfully many alloy steels which have hitherto been considered as being incapable of successful spot or seam welding due to their tendency to crack or become brittle. My new technique can be utilized with either manual or automatic manipulation of the weld sections being welded. A series of spot welds may be made rapidly and efficiently. Little if any additional equipment over and above conventional welding equipment is required. My method, therefore, is characterized by extreme simplicity, efficiency and economy.

While my welding method is especially beneficial from the standpoint of achieving welds in quench-hardened stainless steel, it will be appreciated that certain advantages at times are had by employing the method for welding martensitic stainless steel before quench-hardening the metal, thereafter heating and quenching the welded structure for hardening.

Also while many advantages are had in spot or seam welding sheet, strip or like products of martensitic stainless steel in accordance with my method, it will be understood that certain benefits are derived by employing the method for welding other and different shapes of the steel, these sometimes being quite intricate in form, and often for achieving electrical resistance welds other than spot or seam welds.

It will be appreciated also that certain advantages in my welding method are had by substituting sources of austenite-forming ingredients, such as substantially pure nickel strip, for the austenitic chromium-nickel shims or the like which I usually employ.

As many possible embodiments may be made of my invention and as many changes may be made in the embodiment hereinbefore set forth it will be understood that all matter described herein is to be interpreted as illustrative and not as a limitation.

I claim:
1. A method of welding 0.08% to 1.20% carbon, 11.0% to 18% chromium martensitic stainless steel sheet, strip, or the like, the art which includes inserting a nickel-bearing austenite-forming shim between superimposed portions of said martensitic steel to introduce substantial quantities of austenite in the intended weld, and passing an electric welding current through said shim and steel and across the contacting surfaces thereof to produce a welded joint.

2. A method of spot-welding or seam welding 0.08% to 1.20% carbon, 11.0% to 18.0% chromium martensitic stainless steel to a base member, which comprises introducing a shim of austenitic stainless steel of approximately 18% chromium–8% grade between said martensitic stainless steel and said base member and in sufficient quantity to introduce substantial amounts of austenite in the intended weld, and passing an electric welding current through said martensitic and austenitic steels and said base member and across the contact surfaces thereof to produce a welded joint.

3. A method of welding 0.08% to 1.20% carbon, 11.00% to 18.0% chromium martensitic stainless steel sheet, strip, or like product to a base member, which comprises providing an austenitic stainless steel insert of approximately 18% chromium–8% nickel grade between said martensitic steel product and said base member and in contact therewith and of about 1/20 the thickness of the martensitic steel product to introduce substantial quantities of austenite to the intended weld, and passing an electric weld current through said martensitic stainless steel product and austenitic stainless steel insert and base member and across the contact surfaces thereof to produce a welded joint.

4. A welded product comprising a plurality of superimposed portions including 0.08% to 1.20% carbon, 11.0% to 18.0% chromium martensitic stainless steel sheet, strip or like member, a base member, and a nickel-bearing austenite-forming insert between said members and immediately contacting the same; and a plurality of localized substantially ductile electrical resistance welds securing the whole, said welds containing substantially large quantities of austenite as compared with the parent steel member.

5. A welded product comprising at least two parts of martensitic 0.08% to 1.20% carbon, 11.0% to 18.0% chromium stainless steel sheet, strip or the like, and an austenite-forming chromium-nickel stainless steel insert therebetween; and a plurality of ductile electrical resistance welds securing the whole together, said welds containing substantially large quantities of nickel as compared with the parent steel.

GEORGE EDWIN LINNERT.

REFERENCES CITED

The following references are of record in the file of this patent:

UNITED STATES PATENTS

| Number | Name | Date |
|---|---|---|
| 2,024,150 | Davignon | Dec. 17, 1935 |
| 2,214,002 | Trainer et al. | Sept. 10, 1940 |
| 2,285,554 | Austin | June 9, 1942 |

OTHER REFERENCES

"The Fabrication of U. S. S. Stainless Steels," 1939, page 1, American Steel and Wire Company, New York, N. Y.

"Page-Allegheny Stainless Steel Welding Electrodes," Page Steel and Wire Division, American Chain and Cable Company, Inc., Bridgeport, Conn.

"The Welding Engineer," October 1946, pages 44, 47, and 49.